(12) United States Patent
Cho

(10) Patent No.: US 9,643,483 B2
(45) Date of Patent: May 9, 2017

(54) AIR DUCT FOR VEHICLE

(71) Applicants: Hyundai Motor Company, Seoul (KR); Kia Motors Corporation, Seoul (KR)

(72) Inventor: Yoon Geun Cho, Daegu (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/947,903

(22) Filed: Nov. 20, 2015

(65) Prior Publication Data

US 2017/0072785 A1 Mar. 16, 2017

(30) Foreign Application Priority Data

Sep. 15, 2015 (KR) .................. 10-2015-0130529

(51) Int. Cl.
*B60K 13/02* (2006.01)

(52) U.S. Cl.
CPC .......... *B60K 13/02* (2013.01); *B60Y 2304/05* (2013.01)

(58) Field of Classification Search
CPC B60H 1/00278; H01M 10/613; H01M 10/66; H01M 10/625
See application file for complete search history.

(56) References Cited

U.S. PATENT DOCUMENTS

| 6,116,288 A * | 9/2000 | Yamamura | F02M 35/10091 138/118 |
| 2011/0107994 A1* | 5/2011 | Satarino | F02M 35/10144 123/184.21 |

FOREIGN PATENT DOCUMENTS

| JP | H07-217511 A | 8/1995 |
| JP | 2000-249010 A | 9/2000 |
| JP | 2005-282449 A | 10/2005 |
| JP | 2008-297936 A | 12/2008 |
| KR | 2012-0069351 A | 6/2012 |
| KR | 10-1326839 B1 | 11/2013 |
| KR | 2014-0036780 A | 3/2014 |
| KR | 10-1488279 B1 | 2/2015 |

* cited by examiner

*Primary Examiner* — John Walters
*Assistant Examiner* — James Triggs
(74) *Attorney, Agent, or Firm* — Mintz Levin Cohn Ferris Glovsky and Popeo, P.C.; Peter F. Corless

(57) ABSTRACT

An air duct for a vehicle is provided. The air duct includes a first duct component that is formed from a rigid material through which air external air is introduced. A second duct component is formed from a pliable material through which introduced air is discharged towards an air filter. The second duct component is formed integrally with the first duct component.

9 Claims, 3 Drawing Sheets

AIR DUCT FOR VEHICLE

CROSS REFERENCE TO RELATED APPLICATION

The present application claims priority to Korean Patent Application No. 10-2015-0130529, filed Sep. 15, 2015, the entire contents of which is incorporated herein for all purposes by this reference.

BACKGROUND

Field of the Invention

The present invention relates to an air duct for a vehicle and, more particularly, an air duct that is fabricated as a single unit that provides an improved vibration-damping feature.

Description of the Related Art

Generally, a vehicle engine generates power by combusting an air-fuel mixture. For example, the engine generates power via intake, compression, explosion, and exhaust strokes of the air-fuel mixture formed by mixing a fuel stored in a fuel tank and supplied through various fuel supplies with air introduced from the atmosphere. Accordingly, to drive an engine to generate power, a specified amount of air is required from the atmosphere for the combustion of the engine. In particular, a vehicle is equipped with an air intake system to supply air for the combustion of an engine. Typically, an air intake system includes an air duct, an air filter, and a resonator.

The air duct serves to is configured to suction air from the atmosphere, the air filter filters the air supplied through the air duct and supplies the air it to an engine, and the resonator serves to dampens noise caused by the flow of suctioned air. However, the resonator dampens noise in a specified frequency, thereby having a negative effect on a design layout of an engine compartment. A separate bellows structure is often disposed between air ducts to improve a noise characteristic. Conventional air ducts include an upper duct component, a lower duct component, a bellows duct component, and an adapter, which are coupled together and assembled into a final product. However, conventional assembly methods complicate the structure of the air duct, resulting in increased cost and weight and degraded sealing and vibration-damping features.

The above information disclosed in this section is merely for enhancement of understanding of the background of the invention and therefore it may contain information that does not form the prior art that is already known in this country to a person of ordinary skill in the art.

SUMMARY

The present invention provides an air duct for a vehicle having rigid and pliable components are formed as a single unit and the reduced number of components may minimize the weight and cost and maximize sealing and vibration-damping features.

In one aspect, the present invention provides an air duct for a vehicle that may include a first duct component formed from a rigid (e.g., hard) material through which air may be suctioned (e.g., externally introduced) and a second duct component formed from a pliable (e.g., soft) material through which suctioned air may be discharged towards an air filter, wherein the second duct component may be integrally formed with the first duct component.

The second duct component may be injection-molded and the second duct component may be circumferentially disposed on a first (e.g., one) side thereof with a plurality of coupling apertures. The first duct component may be injection-molded into one piece with the second duct component and the first duct component may fill the coupling apertures. The coupling apertures may have diameters that increase towards a medial side of the second duct component.

The first duct component may include a lower duct component attached to a lower end thereof. The second duct component may have a bellows shape. The second duct component may be circumferentially disposed on a second (e.g., the other) side thereof and may include plurality of ribs disposed (e.g., inclined) at a predetermined angle. According to the air duct for a vehicle having the above-mentioned configuration, the rigid-duct component and the pliable-duct component may be formed integrally. The number of components, the weight and the cost may be minimized. Further, the air duct may provide an improved sealing feature, thereby preventing pressure loss and maximizing a vibration-damping effect.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

The present invention will be described more fully hereinafter with reference to the accompanying drawings, in which exemplary embodiments of the invention are shown. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Figure 1:
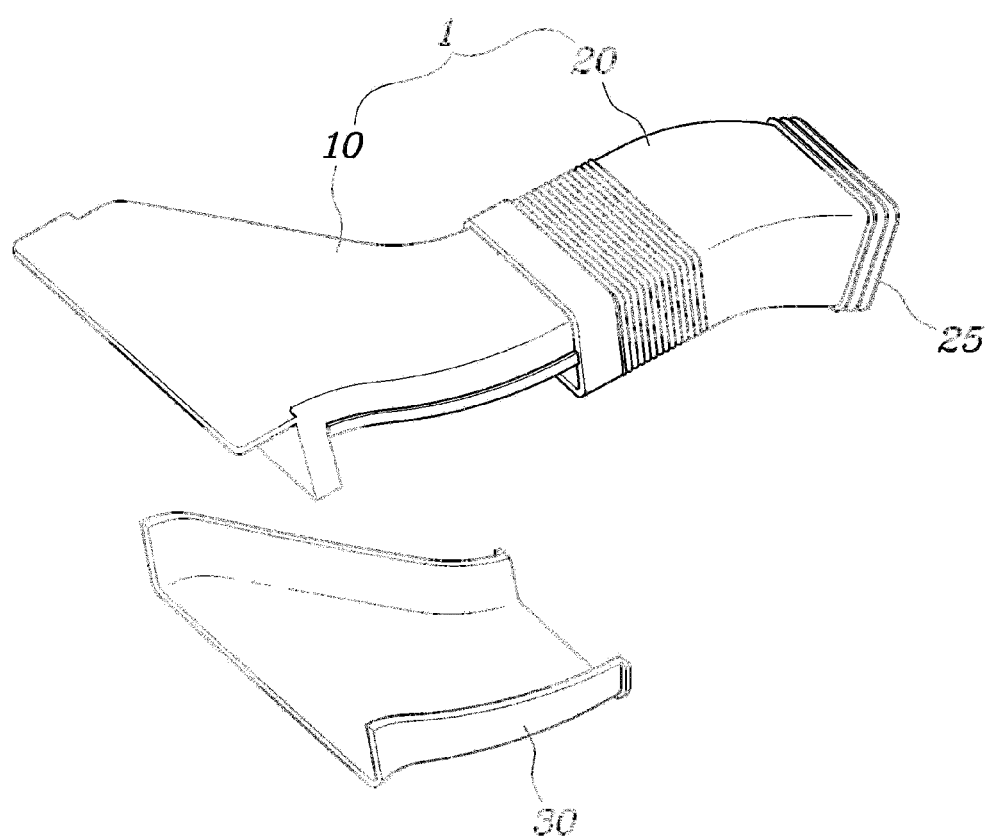
FIG. 1 is an exemplary view of an air duct for a vehicle according to an exemplary embodiment of the present invention.

Hereinbelow, exemplary embodiments of an air duct for a vehicle will be described with reference to the accompanying drawings. FIG. 1 is an exemplary view of an air duct for a vehicle according to an exemplary embodiment of the present invention. Referring to FIG. 1, an air duct 1 for a vehicle may include a first duct component 10 formed from a rigid (e.g., hard) material through which air may be introduced from the external environment, and a second duct component 20 formed from a pliable (e.g., soft) material through which introduced air may be discharged towards an air filter. The second duct component 20 may be formed integrally with the first duct component 10. The air duct 1 may guide air suctioned from the atmosphere towards an air filter (not shown) therethrough. The first duct component 10 may be disposed on the side when air is externally introduced, and the second duct component 20 may be disposed proximate to the air filter.

In particular, the first and second duct components 10 and 20 may be molded as a single unit in the manufacturing process, therefore the components are not required to be separately fitted together. In other words, a separate assembly process may be omitted and thus the manufacturing cost and time may be reduced. Additionally, a sealing feature may be improved and may prevent pressure loss attributed to leakage of air. Further, since the second duct component 20 may be formed of a pliable (e.g., soft) material, the vibration generated during the operation of an engine may be restricted from propagating to the body of a vehicle, thereby improving the noise, vibration and harshness (NVH) performance of a vehicle.

Figure 2:
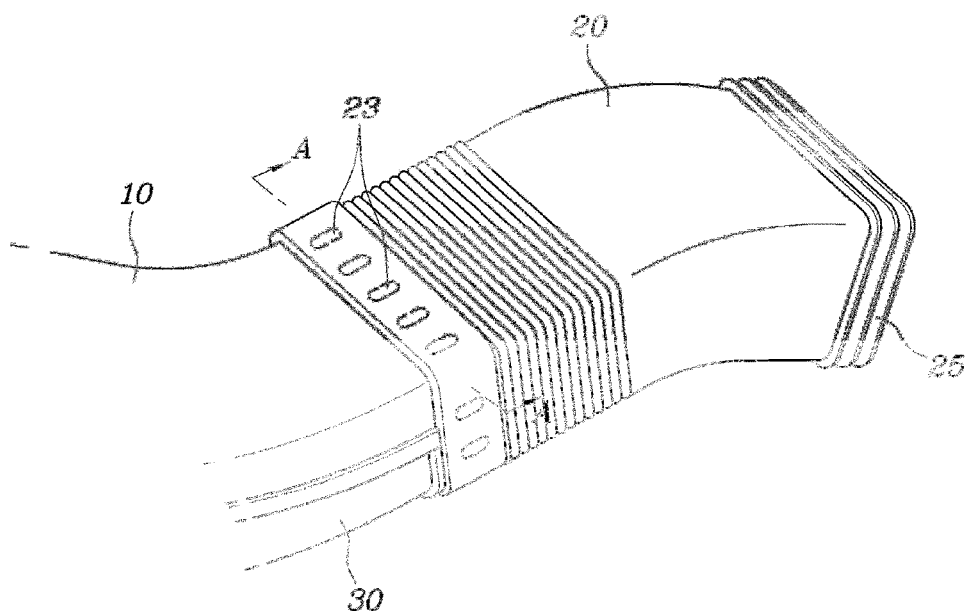
FIG. 2 is an exemplary enlarged view of first and second duct components accordingly to an exemplary embodiment of the present invention.
Figure 3:
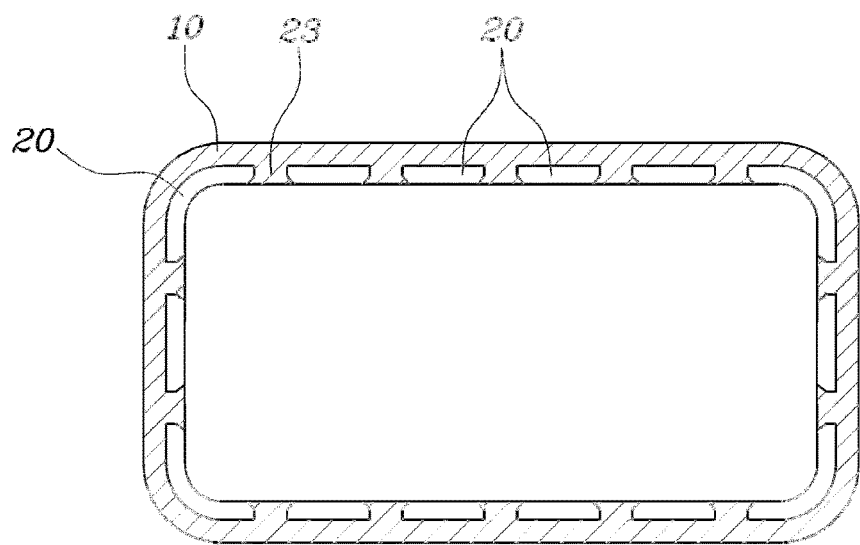
FIG. 3 is an exemplary cross-sectional view of the air duct for a vehicle according to an exemplary embodiment of the present invention.

FIG. 2 is an exemplary enlarged view of first and second duct components 10 and 20. FIG. 3 is an exemplary cross-sectional view of the air duct for a vehicle. Referring to FIGS. 2 and 3, the second duct component 20 may be injection-molded having the second duct component 20 circumferentially disposed on a first (e.g., one) side thereof with a plurality of coupling apertures 23. The first duct component 10 may be injection-molded into one piece with the second duct component 20 and the first duct component 10 may fill the coupling apertures 23. In other words, the first and second duct components 10 and 20 may be assembled together by double injection-molding. The coupling apertures 23 of the second duct component 20 may be provided for stable coupling between two materials that have different properties (e.g., rigid material and pliable material).

The first duct component 10 may be injection-molded to surround one side of the second duct component 20. For example the first duct component 10 may be integrally formed with the second duct component 20 and covers the coupling apertures 23 of the second duct component 20. In particular, the coupling apertures 23 may have diameters that increase towards a medial side of the second duct component 20.

The first duct component 10 of the rigid material may be integrated with the second duct component 20 of the pliable material, and may secure coupling strength of the coupled section is important. In other words, the coupling apertures 23 of the second duct component 20 may be formed to be inclined. Accordingly, the first duct component 10 may be injection-molded and a resinous material of the first duct component 10 may flow into the coupling apertures and may be cured. An integrated body of the first and second duct components 10 and 20 may be formed therefrom.

Figure 4:
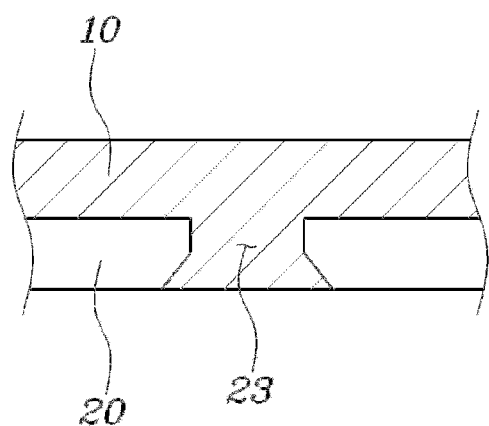
FIG. 4 is an exemplary cross-sectional view of coupling apertures of the second duct component according to an exemplary embodiment of the present invention.

FIG. 4 is an exemplary cross-sectional view of the coupling apertures of the second duct component. Referring to FIG. 4, the resinous material of the first duct component 10 may be poured (e.g., flow) into the coupling apertures 23 and the surrounding portions of the second duct component 20 to form the integrated body. The cured material of the first duct component 10 may prevent a motion of the second duct component 20, and may secure the coupling strength of the air duct 1 for a vehicle. The first duct component 10 may be disposed and a lower duct component 30 may be attached to a lower end thereof. In other words, the first duct component 10 may be formed as an upper duct component, and the first duct component may be opened towards a lower portion thereof, to facilitate the injection-molding of the first duct component 10 with the second duct component 20. After the first duct component 10 is injection-molded with the second duct component 20, the lower duct component 30 may be attached to the lower portion of the first duct component 10, and may define a complete air passage. Further, the second duct component 20 may have a bellows shape. The bellow shape may reduce the vibration propagating towards an engine.

Figure 5:
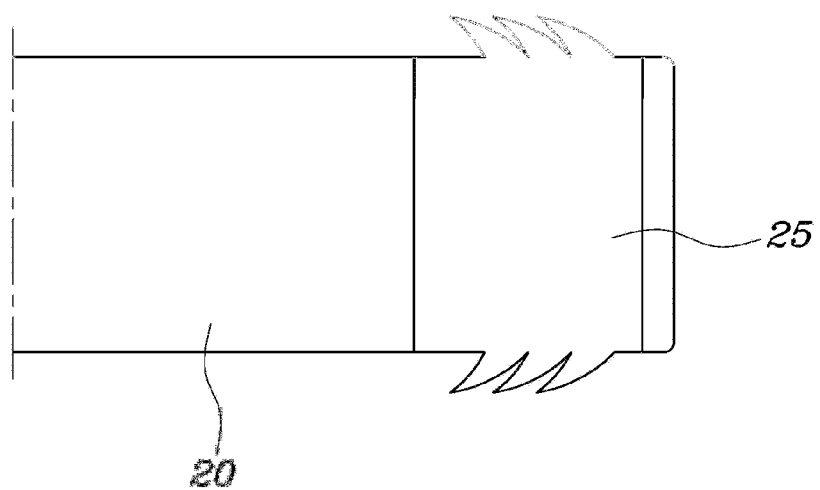
FIG. 5 is an exemplary cross-sectional view of a rib of the second duct component according to an exemplary embodiment of the present invention.

Further, the second duct component 20 may be disposed circumferentially on the second side (e.g., other side) thereof with a plurality of ribs 25 disposed (e.g., inclined) at a predetermined angle. FIG. 5 is an exemplary cross-sectional view of a rib of the second duct component. Referring to FIG. 5, the second side (e.g., other side) of the second duct component 20 may be coupled to an air filter. Further the second side (e.g., other side) may include the ribs 25 that seal a portion disposed between the second duct component 20 and the air filter. In other words, when the air filter is coupled with the second duct component 20 and surrounds the second side (e.g., other side) of the second duct component 20, the ribs 25 may allow air disposed within the second duct component 20 to flow towards the air filter without leakage to the exterior. According to the air duct for a vehicle having the above-mentioned configuration, the rigid-duct component and the pliable-duct component may be formed integrally, thereby minimizing the number of components and reducing weight and cost. Further, the air duct may provide improved sealing feature, and may prevent pressure loss and maximizing a vibration-damping effect.

While this invention has been described in connection with what is presently considered to be exemplary embodiments, it is to be understood that the invention is not limited to the disclosed exemplary embodiments, but, on the contrary, is intended to cover various modifications and equivalent arrangements, without departing from the scope and spirit of the invention as disclosed in the accompanying claims.

What is claimed is:

1. An air duct for a vehicle, comprising:
   a first duct component formed from a rigid material through which external air is introduced; and
   a second duct component formed from a pliable material through which introduced air is discharged towards an air filter,
   wherein the second duct component is integrally formed with the first duct component,
   wherein the second duct component is injection-molded and the second duct component is disposed circumferentially on a first side thereof with a plurality of coupling apertures, and the first duct component is injection-molded into one piece with the second duct component to fill the coupling apertures of the second duct component.

2. The air duct of claim 1, wherein the coupling apertures have diameters that increase towards a medial side of the second duct component.

3. The air duct of claim 1, wherein the first duct component includes a lower duct component attached to a lower end thereof.

4. The air duct of claim 1, wherein the second duct component has a bellows shape.

5. The air duct of claim 1, wherein the second duct component is disposed circumferentially on a second side thereof with a plurality of ribs positioned at a predetermined angle.

6. The air duct of claim 1, wherein the first duct component is formed as an upper duct component, and the first duct component is opened towards a lower portion thereof.

7. The air duct of claim 6, wherein the lower duct component is attached to the lower portion of the first duct component and defines a complete air passage.

8. The air duct of claim 5, wherein the second side of the second duct component is coupled to an air filter.

9. The air duct of claim 5, wherein the second side includes the ribs that seal a portion disposed between the second duct component and the air filter.

* * * * *